3,560,324
FLEXWOOD LAMINATES COMPRISING A LAYER OF THERMOPLASTIC RESIN-CELLULOSE FIBER PARTICLE MIXTURE AND A LAYER OF CELLULOSIC FIBER
John J. Quackenbush, Monroe, Conn., assignor to National Distillers and Chemical Corporation, New York, N.Y.
No Drawing. Filed Nov. 23, 1966, Ser. No. 596,473
Int. Cl. B32b 21/08
U.S. Cl. 161—162                10 Claims

ABSTRACT OF THE DISCLOSURE

High strength water resistant laminates are prepared by pressing together one or more sheets of cellulose fiber material and sheets comprising 25% to 75% of a thermoplastic resin and from 75% to 25% of a cellulose fiber filler.

---

Copending applications Ser. No. 590,539, filed Oct. 31, 1966, entitled "Novel Extrudable, Moldable, Thermoplastic Compound" in the name of H. O. Corbett, describes a process for forming a novel extrudable product formed of a thermoplastic resin mixed with a cellulose type fiber such as sawdust. In this product, and when a sufficiently small particle size is used for a portion of the resin product, the heating of the resin during forming of the product causes the small resin particles to substantially uniformly coat the cellulose fiber component, thereby apparently contributing to the strength of adhension between particles in the ultimately formed product.

According to copending application Ser. No. 590,539, thermoplastic shaped products are provided which are constituted of bonded, composite mixtures of a particulate thermoplastic resin and wood or other cellulosic fiber filler, with the thermoplastic resin forming a coating over substantially the entire surface area of the fiber particles. These products can be directly manufactured in any desired configuration e.g., as rods, tubes, sheets, slabs, or in any shaped section, whether solid or intricately cored, by extruding the same at elevated temperatures and pressures. By regulating the initial moisture content of the wood fiber or other cellulose fiber constitutent of the mixture to be extruded to between about 2% and 15% by weight, and extruding the mixture at temperatures of from above the boiling point of water up to as high as about 850° F. and under pressures of from about 250 to 4,000 p.s.i., the desired substantially rigid, cellular foamed structure is produced. The heat and pressure treatment during extrusion is believed to not only evaporate the moisture content of the resin-fiber mixture, thereby creating the desired foamed structure, but to effect the fine dispersion of the thermoplastic resinous material throughout the composition to substantialy completely coat the fiber particles. It is believed that the nearly complete coating, viz., of the order of 90% or greater, of the woody fiber particles creates an intimate and strong bond and imparts increased machine direction and transverse direction stability to the extruded shaped product.

The thermoplastic resins incorporated in the extruded compositions of said application include all those extrudable thermoplastic resinous materials which form coatings upon wood or similar cellulose fiber materials. Resins so useful include polyolefin resins, e.g., polyethylene, polypropylene, ethylene-vinyl acetate copolymers or the like; vinyl resins, e.g., polyvinyl acetate, polyvinyl alcohol, polyvinylidine chloride, polystyrene, or copolymers of such materials; acrylic resins, e.g., polymethyl methacrylate; polyamide resins, e.g., a nylon; or mixtures of such resins. It is, however, preferred to utilize particulate, low density polyethylene resins for at least a portion of the resin component of the mixture employed herein. It has been found that the use of such resins, particularly those having regularly shaped particles with average maximum dimensions of less than about 200 microns, desirably less than 30 microns, insures substantially complete coating of the woody fibrous constituent of the mixture. Employing one such particulate polyethylene material having substantially uniform spherical particles of less than 30 microns, it was found possible to coat in excess of 90% of the woody fibrous constituent admixture therewith.

The wood or similar cellulose fiber constituent of the mixtures may be constituted of any suitable natural wood particles, whether in waste chip, fiber or sawdust form. Thus, for example, Douglas fir wood sawdust or waste chips, or a ground flour derived from Redwood bark, have each been found so useful. Other cellulose fibrous materials, e.g., walnut shell flour, apricot shell flour, ground regenerated cellulose, cork, corn-cobs, or peanut shells, may alternatively be emloyed.

The thermoplastic resin and cellulose fiber constituents may be admixed in the proportion of from about 25% to 75% by weight of the resin and, correspondingly, from about 75% to 25% by weight of the fiber material. Particularly desirable products are obtained employing compositions incorporating from about 25% to 50% by weight of the thermoplastic resin constituent and, correspondingly, from about 50% to 75% of the fibrous constitutent.

It has been found that articles formed of the materials of the above noted application, especially when the resin component particles have a diameter of less than 300 microns, will securely bond to surfaces of other products of cellulose fiber structure when pressed together under heat and pressure. Therefore, in accordance with the invention, it becomes possible to form a plywood-type laminate with sheets of the resin-cellulose fiber construction interleaved with other sheets of cellulose fiber material such as wood veneers, paper, fiber board and the like. For reasons not fully understood, the adhesive bond formed has been found equivalent to the type bond obtained with normal adhesives used for forming most plywood articles. Moreover, the construction permits the use of relatively thick but inexpensive sheets of the resin-cellulose fiber in place of more expensive laminates which have been used, as in plywood, in the past.

An important advantage of the invention is that an intimate-type bond is formed at relatively moderate temperatures and pressures, as compared to those required for standard plywood construction. Thus, there is a further saving in cost since the process parameters for forming the laminate are simpler and relatively non-critical.

When using the resin-cellulose fiber laminate in the multi-ply structure with other cellulose fiber type products, the rate of fabrication is increased since adhesives need not be cured, while the laminated sheets have, by virtue of the relatively flexiblue central ply, the added advantages of reduced weight, a cushioned reaction to high impact blows, water resistance and high strength.

Accordingly, a primary object of this invention is to form a novel inexpensive adhesive for securing together large area sheets of cellulose-type material.

Another object of this invention is to form a novel high strength laminated product which includes an interleaved sheet of resin-cellulose fiber material as an adhesive.

Another object of this invention is to form a novel laminated product which includes an interleaved sheet of a resin-cellulose fiber material which contributes substantially to the thickness and weight of the laminated product.

A further object of this invention is to provide a novel laminated product which can be produced at high speeds and reduced fabrication costs.

Yet another object of this invention is to provide a novel laminated product which has high strength, is water resistant, and is capable of absorbing high impact blows.

These and other objects will become apparent from the following detailed description and examples of the invention.

In the practice of the invention, a sheet of mixtures of a resin and a cellulosic fiber were extruded in accordance with the techniques disclosed in the above noted copending application Ser. No. 590,539, where the resin included small diameter particles of low density polyethylene specifically having a particle size of from 4 to 300 microns. The cellulosic fiber component was in the form of Douglas fir sawdust, and, in some cases, Douglas fir shavings. The small particle size low-density polyethylene is believed operative in adhering the cellulosic fibers together in the subsequently extruded sheet, and in the subsequent adhesion of the sheet to the cellulose composition sheets to which it is laminated. These resin-cellulose fiber sheets were then used to laminate together sheets of various woods, sheets of paper, and sheets of fiber board with uniformly good results in the adhesive bond which is formed. The resulting laminate is strong and insensitive to delamination by moisture.

In forming the lamination, the sheets were found to require pressures of about 1,000 p.s.i. in a preheated die, although this pressure could be reduced to about 250 p.s.i. if the lamination interfaces were preheated. The temperature was found to be preferably below the softening temperature of the resin-cellulosic fiber sheet to prevent its extrusion from the laminate, and/or cracking of the intermediate sheets. The thickness of the resin-cellulosic fiber sheet or the other cellulosic fiber sheets is not critical in the laminating operation.

EXAMPLE I

In a first group of examples, the resin-cellulosic sheet was composed of 40% by volume of mechanically ground 55 mesh low-density polyethylene, 20% by volume of Douglas fir shavings, and 40% by volume of Douglas fir sawdust. This was extruded through a heated extrusion die and the extruded sheet quenched in water as described in application Ser. No. 590,539 with a sheet thickness of about ⅛ inch. A square sample, four inches on a side was sawed from this sheet and placed between two sheets of pine wood of the same area and of about ¼ inch thickness. The three-ply laminate was then placed in a press at room temperature under 250 p.s.i. The press was then heated to 280° F. and the pressure increased to 1,000 p.s.i. Water was then circulated for a few minutes through the press platens until their temperature dropped to 100° F. The press was then opened and it was found that the pine plies were intimately surface bonded to the central resin-cellulose fiber. This bond could not be broken without tearing the wood fibers of the outer laminates, and was insensitive to moisture. The laminated product had high strength, equivalent to a three-ply laminate of the pine wood.

EXAMPLE II

The procedure of Example I was repeated where a five-ply laminate was formed with two sheets of the resin-cellulosic fiber resin interleaved with three sheets of pine. After pressing, the sheets were securely bonded to one another.

EXAMPLE III

A new formulation for the resin-cellulosic fiber sheet was then prepared and extruded in the manner of copending application Ser. No. 590,539 and was used for the remaining samples. The new formulation was composed of 60% by volume of Douglas fir sawdust, 20% by volume of 1–2 mesh low-density polyethylene powder, and 10% by weight of large pellets of an ethylene-vinyl acetate copolymer where the copolymer contains 12–15% by weight of ethylene vinyl acetate. The extruded sheets had a thickness of about ⅛ inch and were cut into sample squares 4 inches on a side. One 4 inch square of the resin-cellulosic fiber sheet was interposed between two similar sheets of pine having a thickness of about ¼ inch with the laminated sheets placed in a press which had been preheated to 280° F. The sheets were then pressed at a pressure of 1,000 p.s.i. for about 2½ minutes. Water was then circulated through the press platens until the press temperature dropped to 100° F. The 1,000 p.s.i. pressure was maintained throughout the cooling time which lasted for about 2½ minutes. The press was then opened and the laminated product which was removed was found to have securely bonded interfaces which could not be mechanically separated.

EXAMPLE IV

The sheets of Example III were formed into a five-ply laminate with two resin-cellulosic fiber sheets interleaved with three pine wood sheets. The press was again preheated to 280° F. and the sample was placed in the press at a pressure of 1,000 p.s.i. for 3½ minutes and was cooled to 100° F. under this pressure. When this experiment was repeated at an increased pressure of 2,000 p.s.i., the middle wood ply broke along the grain and extruded out of the laminated sample.

EXAMPLE V

A three-ply laminate was formed using for the outer wooden plies a ½₂ inch thick veneer. The sample was placed in a press preheated to 280° F. at an initial pressure of 1,000 p.s.i. which was immediately decreased to 500 p.s.i. to prevent cracking of the wood veneers. The press was held at 280° F. for 1 minute and then cooled to 100° F. by circulating water through the press platens. The laminated product was removed from the press and was found to have the wood veneers securely adhered to the upper and lower surfaces of the central resin-cellulosic fiber body. The sample was also found to exhibit extremely high strength apparently because of the I beam construction of outer rigid sheets supported on a relatively flexible central body.

EXAMPLE VI

Two sheets of ¼ inch three-ply plywood (marine grade) received a sheet of the resin-cellulose fiber material between them where all sheets have dimensions of 4 inches by 6 inches. The total weight of the two plywood sheets was 105 grams while the weight of the resin-cellulosic fiber sheet was 47 grams. The overall thickness of the three laminates was 0.625 inch. This sample was then placed in a press which was preheated to 300° F. and were held under a pressure of 1,000 p.s.i. for 5½ minutes. The press was then cooled to a platen temperature of 100° F. under the pressure. Good adhesion was obtained where the overall thickness of the three-ply was compressed to 0.528 inch while the weight of the laminated product was reduced from its initial total weight of 152 grams to 137 grams due to driving off of moisture during the pressing operation.

EXAMPLE VII

A three-ply arrangement of 4 inch squares was prepared using two outer thick pine sheets of approximately ¾ inch thickness which had interposed between them the resin-cellulose fiber sheet. The total weight of the pine was 155.6 grams while the total weight of the resin-cellulosic fiber sheet was 30.9 grams for a total weight prior to lamination of 186.5 grams. The overall thickness of the sheets prior to lamination was 1.661 to 1.625 inches. The laminates were placed in a preheated oven held at a temperature of 300° F. for 15 minutes, so that the surface temperatures of the pine reached 135° F. while the surface temperatures of the resin-cellulosic fiber reached about 200° F. The samples were then placed in a press which was at room temperature and pressed at a pressure of 250 p.s.i. for about 2 minutes. A successful laminated product was formed in this manner which had a total weight of 170.6 grams and a thickness which ranged from 1.560 to 1.550 inches.

EXAMPLE VIII

A three-ply laminate was formed using a central layer of the resin-cellulosic fiber sheet with outer layers of tempered Masonite having ⅛ inch thickness. Prior to lamination, the overall thickness of the three sheets was 0.400 inch. The stack was then placed in a 300° F. oven for 8 minutes with the surface temperature of the Masonite reaching 140° F. and the surface temperature of the resin-cellulosic fiber sheet reaching 200° F. These were then placed in a press at room temperature under 250 p.s.i. for 2 minutes, whereupon a successful laminated product was formed. The overall thickness of the product ranged from 0.340 to 0.350 inch.

EXAMPLE IX

The procedure of Example VIII was repeated for the preparation of a five-ply structure having two sheets of resin-cellulosic material interposed between three tempered Masonite sheets. After pressing, the overall thickness of a successfully formed laminate was reduced from an original 0.690 to 0.680 to a final 0.573 to 0.590 inch.

EXAMPLE X

The procedure of Example VIII was repeated where the tempered Masonite sheets were replaced by untempered Masonite sheets. Again, good results were obtained where the overall thickness of the sheets was reduced from 0.400 inch to 0.340 to 0.355 inch. This experiment was again repeated where, however, the untempered Masonite was not preheated in the oven and only the resin-cellulosic fiber sheet was preheated. After pressing at 250 p.s.i. for 2 minutes, it was found that no adhesion was obtained, although when the untempered Masonite is preheated, good adhesion is obtained.

EXAMPLE XI

The procedure of Example X was repeated where again the tempered Masonite sheets were replaced by untempered Masonite sheets. Again, a successful laminate was formed with the innitial overall thickness of 0.675 to 0.690 inch being reduced to 0.565 inch to 0.578 inch.

EXAMPLE XII

A nine-ply structure was formed composed of four sheets of resin-cellulosic fiber material interleaved between a first ¼ inch three-ply plywood sheet; a third ⅛ inch tempered Masonite sheet; a fifth 3/32 wood paneling sheet; a seventh ⅛ inch untempered Masonite sheet and a ninth 1/32 inch veneer. Each of these components were first placed in a 300° F. oven for 8 minutes and were thereafter pressed at 250 p.s.i. for 5 minutes. A successful laminated product was formed which could not be delaminated by pressure or by moisture.

EXAMPLE XIII

Two sheets of brown kraft paper were placed on either side of the central sheet of ⅛ inch resin-cellulosic fiber material and were placed in a press which was preheated to 350° F. The sample was then pressed at 250 p.s.i. and the platens water cooled to 100° F. while the sample was under pressure. A successful bond was formed between the kraft paper and the resin-cellulosic fiber body. This procedure was repeated at a reduced press preheat of 230° F. with the sample pressed at 250° p.s.i. for 70 seconds. The press was then water cooled under pressure down to 100° F. during this time where, again, a successful laminated product was formed.

EXAMPLE XIV

A three-ply laminate was formed using 1/32 inch paper board having the interposed resin-cellulosic fiber sheet. The assembly was placed in a press which was preheated to 230° F. and the sample pressed at 250 p.s.i. for 2 minutes. The press platens were then water cooled to 100° F. under pressure and a successful laminated product was formed. This procedure was then repeated with the press preheated to 300° F. with the sample pressed at 250 p.s.i. for 60 seconds with the press water cooled under pressure down to 100° F. Again a successful laminated sample was produced.

EXAMPLE XV

Three pieces of brown kraft paper had interleaved therebetween two sheets of the resin-cellulosic fiber material with the stack placed in a press heated to 350° F. The sample was then pressed at 250 p.s.i. for 1 minute and 45 seconds while the press was water cooled under pressure down to 100° F. A successful product was formed.

EXAMPLE XVI

The procedure of Example XV was repeated using 1/32 inch paper board in place of the kraft paper while pressing the sample for 2 minutes and 15 seconds. Again a successful product was formed.

The embodiments of the invention in which an exclusive privilege or property is claimed are defined as follows:

1. A laminated product comprising a layer consisting essentially of a thermo-plastic resin-cellulose fiber particle mixture said thermoplastic resin consisting essentially of a member of the group consisting of low density polyethylene, ethylene-vinyl acetate copolymers and mixtures thereof adhering in firm surface-to-surface contact with a layer consisting essentially of a cellulose fiber body, said resin-fiber layer contributing substantially to the total weight and thickness of said laminate.

2. The laminated product of claim 1 wherein the thermo-plastic resin component of the resin-fiber layer is at least partially composed of polyethylene.

3. The laminated product of claim 1 wherein the cellulose fiber particles are wood.

4. The laminated product of claim 1 wherein the cellulose fiber layer is composed of material selected from the group consisting of wood, paper, and fiber board.

5. The laminated product of claim 1 wherein both sides of the resin-fiber layer are in firm surface-to-surface contact with a layer of a cellulose fiber body.

6. The laminated product of claim 1 wherein the resin fiber layer comprises 25 to 75 weight percent thermoplastic resin and 75 to 25 weight percent cellulose fiber particles.

7. The process for forming a laminated product comprising pressing together a sheet consisting essentially of a thermoplastic resin-cellulose fiber mixture and a sheet consisting essentially of a cellulose fiber material at an elevated temperature below the flow temperature of the thermoplastic resin-cellulose fiber mixture and at elevated pressure, said thermoplastic resin consisting essentially of a member of the group consisting of polyethylene, ethylene-vinyl acetate copolymers and mixtures thereof.

8. The process of claim 7 wherein the pressure is in the range 250 to 2,000 p.s.i.

9. The process of claim 7 wherein the temperature at the interface of the sheets is above 100° F.

10. The process of claim 7 wherein the thermoplastic resin-cellulose fiber sheet is pressed between two layers of cellulose fiber sheet.

References Cited
UNITED STATES PATENTS

| | | | |
|---|---|---|---|
| 3,119,731 | 1/1964 | Ströle et al. | 162—164 |
| 3,428,508 | 2/1969 | Quick et al. | 156—322X |
| 3,462,342 | 8/1969 | Copper et al. | 156—314X |

HAROLD ANSHER, Primary Examiner

D. J. FRITSCH, Assistant Examiner

U.S. Cl. X.R.

156—62.2, 62.8, 309, 311; 161—170, 250